Patented Aug. 8, 1939

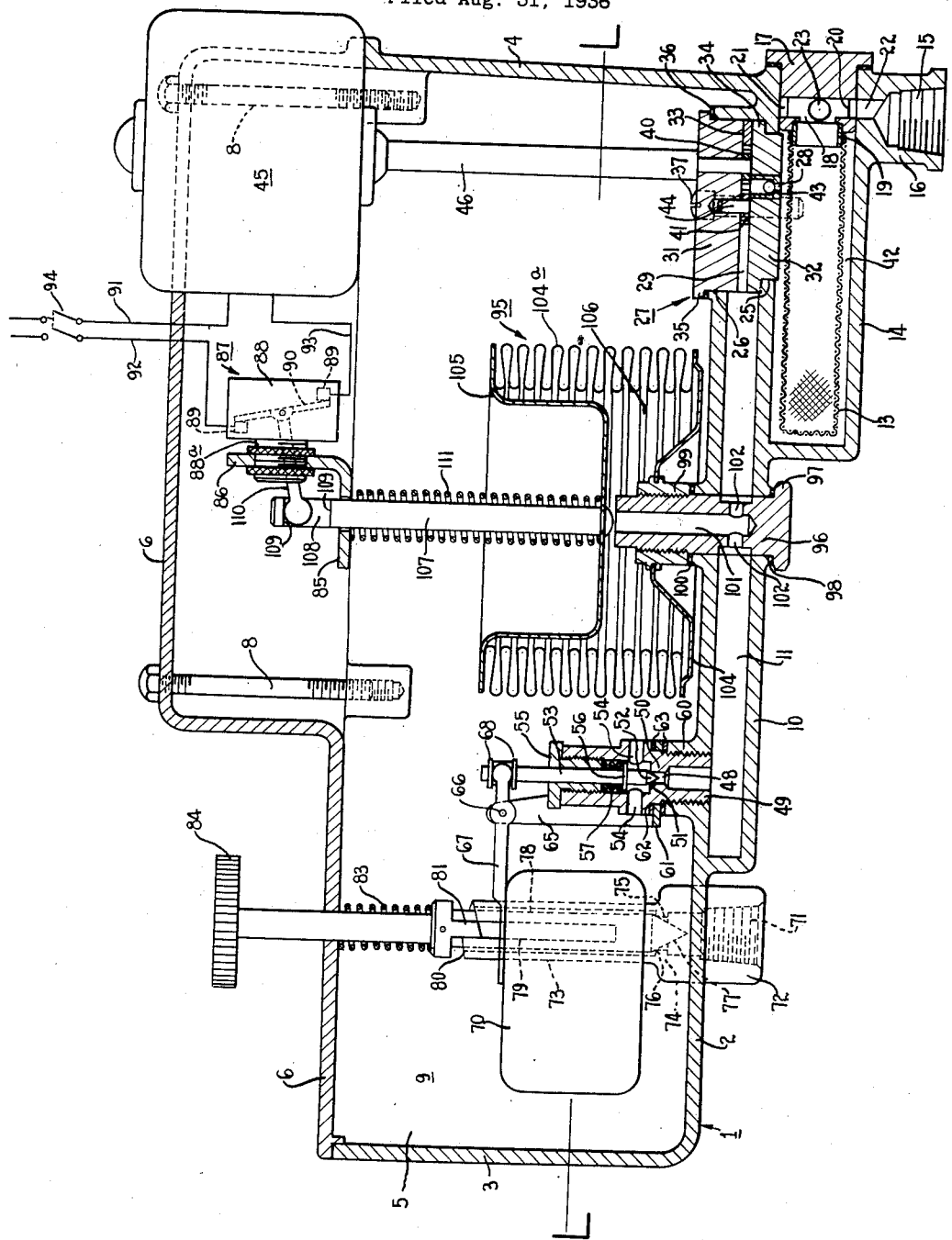

2,168,307

UNITED STATES PATENT OFFICE 2,168,307

CONTROL DEVICE

Albert G. Hann and Philip S. Russel, Detroit, Mich., assignors to Detroit Lubricator Company, Detroit, Mich., a corporation of Michigan Application August 31, 1936, Serial No. 98,718

13 Claims. (Cl. 103—25)

Our invention relates generally to control devices and more particularly to liquid supply control devices.

One of the objects of our invention is to provide a new and improved liquid supply control device of the type employing a pump for conveying the liquid, and to provide a device of this character in which the operation of the pump is controlled in accordance with changes in the volume of liquid required to be supplied.

Another object of our invention is to provide a new and improved liquid supply control device having a reservoir to which liquid is supplied by a pump, and to provide for controlling the operation of the pump in accordance with changes in the level of the liquid in the reservoir.

Another object of our invention is to provide a device of the above-mentioned character in which the operation of the pump is controlled in accordance with variations in volume of the liquid, and in a manner such that the pressure of the liquid in the supply line is maintained substantially constant.

Another object of our invention is to provide a novel pressure responsive actuator operable to start and/or stop a pump, and one which will serve to maintain the pressure of the liquid in the supply line substantially constant both during operation of the pump and during the time period between stopping and starting of the pump.

In the drawing our invention is illustrated by a single view of a control device shown partly in section and partly in elevation.

Referring to the drawing by characters of reference the numeral 1 designates in general a casing which may be of general rectangular shape having a bottom wall 2, end walls 3 and 4, side walls 5, and a top wall 6. The top wall 6 may be in the form of a removable closure member, or plate-like cover, and may be held in place by screws 8 or by other suitable means. Besides housing the mechanisms of the device, the casing 1 also defines a chamber or reservoir 9 for liquid, for our device is adapted among other uses for controlling the supplying of oil to an oil burner (not shown) by gravity feed from the reservoir 9, wherein a substantially constant liquid level is maintained to obtain constant rate of flow to the burner. A conduit 10 provides a passage 11 for liquid en route to the reservoir 9 from a source of supply, and this conduit may extend longitudinally of the casing 1 and may be integral with and be disposed beneath the casing bottom wall 2. Preferably an inlet chamber 12 is provided for housing a tubular shaped strainer 13, and this chamber may be located beneath the conduit 10 adjacent the casing end wall 4. The inlet chamber 12 is preferably in the form of a bore extending longitudinally of the casing 1 and may be defined by a wall 14 integral with the conduit 10. The chamber 12 may have an inlet 15 defined by a downwardly directed tubular boss 16 that may be connected to a source of liquid supply by a conduit (not shown).

The chamber 12 has an open end that may be closed by a closure plug 17 which, in the present instance, also supports the strainer 13. The inner end of the closure plug 17 may be provided with a bored recess 18 and the open end of the strainer 13 may be provided with a sleeve 19 for fitting into the bored recess 18 to secure the strainer and closure plug together. In the present construction the closure plug 17 is provided with an external annular slot 20 within chamber 12, and the slot 20 cooperates with the wall of conduit 10 to provide an annular chamber 21 that communicates with the inlet 15 through a bore 22, and communicates with the bored recess 18 through one or more lateral bores 23.

In the wall of conduit 10 there is provided an aperture 25 overlying and opening into the strainer chamber 12, and in the casing bottom wall 2 there is an aperture 26 that overlies or registers with the aperture 25. Positioned in the apertures 25 and 26 there is a pump 27 having an inlet 28 communicating with the strainer chamber 12, and an outlet 29 communicating with the conduit 10. The pump 27 may be constructed in any suitable manner and, in the present instance, the body of the pump is of sectional construction comprising an upper, substantially horizontal, plate-like section 31 and a lower plate-like section 32 which are spaced by a plate-like spacer member 33. The lower section 32 of the pump body closes the aperture 25 in conduit 10 and may be formed with an external annular flange 34 for seating on the lower inner wall surface of the conduit 10. The upper section 31 of the pump body closes the aperture 26 in the casing bottom wall 2 and may be provided with an external annular flange 35 for seating on the inner wall surface of the bottom wall 2. Preferably a gasket 36 is provided between the flange 35 and the casing bottom wall 2 to insure a fluid-tight connection, and screws 37 or other suitable means may be employed to clamp the body sections and spacer member together and to the casing 1.

The spacer member 33 is provided with the usual elongated aperture, the wall of which cooperates with the body sections to provide an enclosed space or chamber for a pair of gears 40 and 41 that constitute the pumping means. The spacer member 33 may be provided with an aperture or slot leading from the gear chamber and constituting the outlet 29 of the pump. The pump inlet 28 is preferably defined by a tubular valve seat member 42 that may be inserted in a vertically extending aperture through the lower section 32 of the pump body, and the member 42 has an upwardly facing seat for a ball check valve 43 that prevents back-flow of liquid through inlet 28. The gear 41 constitutes the driven gear and may be journaled for rotation on a stub shaft 44 secured in and to the upper section 31 of the pump body. The other gear, or gear 40, is preferably driven by an electric motor 45 that may be mounted on the casing 1 adjacent the top thereof. The motor 45 has a depending drive shaft 46, a lower end portion of which extends through an aperture in the upper pump body section 31 for connection with the drive gear 40.

Adjacent the other end of the conduit 10, toward the casing end wall 3, there is a flow-restricting passage 48 connecting the conduit 10 and the reservoir 9 and this passage 48 is preferably provided in a removable, tubular-shaped valve seat member or fitting 49 that may be threaded into an aperture in the casing bottom wall 2. The valve seat member 49 extends vertically upward in reservoir 9 and is formed having a transverse wall 50 in which the flow-restricting passage 48 is located. The passage 48 through transverse wall 50 provides an upwardly facing port and seat 51 for cooperating with the conical face 52 of a reciprocal valve member 53. Above the valve seat the seat member 49 may be provided with one or more laterally extending passages or bores 54 through its side wall for the passage of oil or other liquid into the reservoir 9. Into the upper end of the valve seat member 49 there is preferably screw-threaded a closure plug 55 having a vertically extending bore therethrough for receiving and guiding the valve member 53. Preferably the valve member 53 is formed having an external annular flange 56 within the valve seat member 49, and surrounding the valve member 53 there is a helical coil spring 57 having its lower end abutting the flange 56 and its upper end abutting the inner end of the closure plug 55. The coil spring 57 acts to move the valve member 53 toward its seat 51.

The casing bottom wall 2 is preferably formed having an integral, upstanding tubular boss 60 into which a lower end portion of the valve seat member 49 screw threads, and mounted on the upper end of the boss 60 there is a supporting member, preferably of U-shape, having a base 61 provided with an aperture to receive the valve seat member 49. The valve seat member 49 is preferably provided with a downwardly facing, external annular shoulder 62 and between this shoulder and the upper end of the boss 60, the base 61 of the U-shaped support may be tightly clamped. Preferably gaskets 63 are provided on opposite sides of the base 61 to insure a leak-proof connection. The U-shaped support has a pair of arms or sides 65 that are integral with and extend upwardly from the base 61 in spaced, substantially parallel relation, and adjacent their upper ends the sides 65 are provided with aligned apertures for receiving a pin 66 on which a lever 67 is pivotally supported. One end of the lever 67 is preferably bifurcated to receive the valve member 53 and the valve member 53 preferably has a pair of spaced, horizontally disposed, external annular flanges 68 between which the bifurcated end of the lever 67 positions and engages the flanges to actuate the valve. To the other end of the lever 67 there is rigidly secured a float 70 responsive to changes in liquid level for actuating the valve to maintain a predetermined substantially constant liquid level in reservoir 9. The line L—L in the drawing designates the level of the liquid to be maintained in reservoir 9, but it will be understood that any level may be selected.

The reservoir 9 has an outlet 71 that may be defined by a downwardly directed tubular boss 72 integral with the casing bottom wall 2, and the boss 72 may be connected to an oil burner by a conduit (not shown). The outlet 71 opens upwardly into a vertically extending tubular valve chamber that may be formed by a wall 73 integral with a side wall of the casing 1. The tubular valve chamber has an internal transverse wall 74 having an aperture 75 therethrough providing an upwardly facing port and valve seat 76 for cooperation with the conical face 77 of a manually operable valve member 78. In the wall 73 defining the valve chamber there is preferably provided a vertically extending slotted opening 79 for the passage of oil from reservoir 9 into the valve chamber. On the upper end of the tubular wall 73 there may be provided a cam face 80 for engagement with a cam follower 81 carried by the valve 78 for raising and lowering the valve relative to its seat. Surrounding an upper end portion of the valve member or stem there is a helical coil spring 83 having its lower end abutting the upper face of the cam follower member 81 and having its upper end abutting the underside of the casing cover 6, the spring 83 urging the cam follower downward against the cam 80 to increase friction therebetween. The valve stem projects externally of the casing 1 through an aperture in the cover 6, and a thumb screw or knob 84 may be secured to its upper end for rotating the valve 78. By rotating the valve 78 it will be seen that the rate of flow from outlet 71 may be regulated as desired.

The casing cover 6 is preferably formed having a substantially horizontally disposed flange 85 within the casing 1, and the flange 85 preferably has an upturned flange portion 86 to which is secured a switch means 87 for controlling the operation of the electric motor 45, and therefore controlling the operation of the pump 27. The switch means 87 may include a housing or casing 88 that is preferably secured to the flange 86 by an open ended, externally threaded tube 88ª that may have one end secured in and to a wall of the housing 88 and its other end secured in and to the upright flange 86. Within the switch housing 88 there may be provided a pair of fixed contact members 89 for cooperation with a switch arm 90 that may be pivoted intermediate its ends and serve as a conductor between the pair of contacts 89. One terminal of the motor 45 and one of the contact members 89 may be connected to main lead wires 91 and 92 respectively, and the other terminal of the motor 45 may be connected to the other contact member 89 by a lead wire 93. In the main lead wire 91 there may be provided a manually operable switch 94. The contacts 89 and the pivotal switch 90 are arranged, in the present instance, such that when the switch 90 is pivoted in a counterclockwise direction, to the position shown in the drawing, the switch engages both contacts 89 closing the circuit to the motor 45 providing, of course, that the manual switch 94 is in closed circuit position.

The switch 90 is actuated by a variable volume pressure responsive actuator 95 comprising an expansible reservoir or chamber element that is disposed in reservoir 9 and is responsive to and actuated by change in its volumetric capacity and by the pressure in flow passage 11. At a point between the pump outlet 29 and the flow-restricting passage 48, the casing bottom wall 2 and the wall of conduit 10 are preferably provided with aligned apertures for receiving a vertically extending, tubular-shaped conduit member 96 that extends transversely through passage 11 and preferably has a head 97 at its lower end for abutment against the underside of the conduit 10. Between the head 97 and the wall conduit 10 there is preferably provided a gasket 98 to insure a leak-proof connection. The tubular member 96 projects upwardly within the casing 1 and adjacent its upper end is preferably externally threaded for receiving a nut 99 which secures the member 96 to the casing 1. Between the lower end of the nut 99 and the casing bottom wall 2 there is preferably provided a gasket 100 to insure a fluid-tight connection. The tubular-shaped member 96 is formed having a vertically extending bore 101 that opens at one end through the upper end of member 96, and preferably the bore 101 terminates adjacent the lower end of member 96. A transversely extending bore 102 is provided through the tubular member 96, within conduit passage 11, and the bore 102 intersects the vertical bore 101 communicatively connecting the bore 101 and flow passage 11. A wall or plate member 104 is disposed in the reservoir 9 and has a central aperture for receiving the nut 99, a border portion around the aperture in the plate 104 being rigidly clamped and secured in an external annular groove in the nut 99. Secured and hermetically sealed to an outer border portion of the fixed plate 104 is one end of a bellows member 104ª, the other or free end of the bellows member being preferably hermetically secured and sealed to the periphery of a laterally extending surrounding flange on a cup-shaped movable wall or plate member 105 positioned concentrically within the member 104ª. The end walls 104, 105 and the bellows member 104ª cooperate to provide an expansible chamber or reservoir 106 that communicates with the flow passage 11 through bores 101 and 102 of the tubular member 96. Carried by the bellows movable wall 105 there is a vertically extending thrust member in the form of a rod 107 that extends through and is guided in an aperture in the horizontal flange 85. Adjacent its upper end the thrust rod is preferably formed having a flattened portion 108 providing spaced, substantially horizontal and opposed abutment shoulders 109 between which is positioned one end of a lever 110 that extends through the tube 88ª and connects the thrust rod 107 and switch arm 90. Preferably the spacing between the opposed abutting shoulders 109 with respect to the width of the lever end positioned therebetween is made such that there will be a lost motion connection between the thrust rod 107 and the lever 110. Surrounding the thrust rod 107 there is a helical coil spring 111 having its upper end abutting the underside of flange 85 and its lower end abutting the bellows movable wall 105 and holding the member 104ª under compression. The spring 111 yieldably opposes expansion of the bellows member 104ª by the pressure of the liquid admitted to chamber 106 and acts to compress the expanded bellows member and force the liquid from the chamber 106 into the flow passage 11 when valve member 52 is open and the pump 27 is at rest in order to maintain the pressure at port 48 substantially constant.

The operation of the herein described device is as follows: Assuming that the reservoir 9 is empty of liquid, the bellows 104ª will be compressed by the coil spring 111, as shown, and the switch 90 will be in engagement with the contact members 89. When the manual switch 94 is closed the electric motor 45 will operate and drive the pump 27 which will pump oil or other liquid from a source of supply through the passage 11 and flow-restricting passage 48 into the reservoir 9, and also into the expansible chamber 106. As the level of the liquid in reservoir 9 rises, the float 70 also rises and moves valve 53 toward its seat, further restricting flow through passage 48 which results in an inrcease in pressure of the liquid in passage 11. As the valve movement toward its seat by float 70 further restricts the port 48, the pressure of the liquid in passage 11 will continue to increase, and at a predetermined pressure of the liquid plus the inherent force of member 104ª, the force exerted by the spring will be overcome and the bellows member 104ª will expand. The expanding of chamber 106 increases the volumetric capacity of the liquid system and as the spring 111 is of the long flexible type, there is very little build-up in the force of the spring through the complete travel of rod 107 so that the increase in the pressure in flow passage 11 is very slight and may be only 2 or 3 ounces as compared to a force of several pounds to initiate movement of rod 107. Movement of the bellows movable wall 105 as the capacity of chamber 106 increases will move the thrust member 107 upwardly, but such movement will not be transmitted to the switch 90 until after the lower shoulder 109 of the thrust member 107 engages lever 110. Upon further expansion of the bellows chamber 106, after positive engagement is made between the thrust rod 107 and lever 110, the switch arm 90 is pivoted in a clockwise direction opening the motor circuit and stopping pump 27. During this period liquid has been admitted as required to the reservoir 9 by the float operated valve to maintain a predetermined substantially constant liquid level in the reservoir with excess liquid being stored in chamber 106. On the "off" phase of the pump the pressure in flow passage 11 would on opening of valve 52 tend to decrease, but the spring 111 compresses the bellows member 104ª, forcing out the stored quantity of fluid in the expansible chamber 106 thereby continuing the supply of the liquid under pressure through passage 11 and exerting a force against the face of the valve 53. Thus the collapsing of the bellows chamber 106 by the spring 111 supplies liquid to the chamber 9 on the "off" phase of pump 27. After the bellows chamber 106 has been compressed or collapsed to the extent that the upper or downwardly facing shoulder 109 of thrust rod 107 engages the lever 110, further movement of wall 105 by spring 111 will act through switch lever 110 to pivot switch arm 90 into engagement with contact members 89. When this occurs the electric motor 45 will again operate to drive the pump and the cycle of storing liquid in and discharging liquid from chamber 106 will be repeated.

It will be seen that restricting of flow through the passage 48 by the valve 53 will cause the very flexible bellows member 104ᵃ to be expanded, increasing the capacity of chamber 106 so that only a very slight increase in the pressure of the liquid in flow passage 11 will occur during operation of the pump. It will also be seen that we have provided a flow control device in which the expansion member or bellows not only acts to maintain the liquid under pressure in the flow conduit, so that liquid will be discharged through the restricting port 48 when valve 53 opens during the time period that the pump is not operating, but also serves to actuate the switch for controlling the operation of the pump. Also by positioning the container or chamber 106 within the casing 1, leakage occurring would be into the reservoir 9 and not spill on the floor to cause a fire hazard and if insufficient to interrupt proper operation of switch means 87 would be compensated by the valve throttling float 70.

While we have shown and described our invention in detail, it is to be understood that it is to be limited only by the appended claims.

What we claim and desire to secure by Letters Patent of the United States is:

1. In a liquid level control device, a casing having a constant level chamber having an inlet and an outlet for liquid, a pump in said casing for delivering liquid into said chamber, control means for said pump, duct means communicatively connecting said pump and said inlet, a float actuated valve controlling said inlet to maintain the level of the liquid in said chamber at a desired substantially constant level, means including a bellows to provide an expansible-contractible liquid storage chamber in said constant level chamber in open communication with said duct means, said bellows having a movable wall against which the liquid pressure acts to expand said bellows thereby to increase the capacity of said chamber, and a spring acting to compress said bellows to maintain said desired liquid pressure on and to discharge the increased capacity to said inlet, said bellows being expanded by liquid upon operation of said pump so as to increase the volumetric capacity of said chamber and acting upon predetermined expansion to actuate said control means to stop said pump.

2. In a liquid feeding apparatus, a conduit for delivery of liquid to a point of use, a reservoir intercalated in said conduit for continuous flow of liquid therethrough, a valve in said conduit and controlling admission of liquid to said reservoir, means operatively connected to and for actuating said valve in accordance with the liquid level in said reservoir, means to feed liquid through said conduit, a closed container having a movable wall portion for increasing the volumetric capacity of said container, means communicatively connecting said container to said conduit intermediate said feeding means and said valve, and means operable by said wall portion upon predetermined increase in the volumetric capacity of said container to control said feeding means.

3. In a liquid feeding apparatus, a conduit for delivery of liquid to a point of use, a reservoir intercalated in said conduit for continuous flow of liquid therethrough, a valve in said conduit and controlling admission of liquid to said reservoir, means operatively connected to and for actuating said valve in accordance with the liquid level in said reservoir, means to feed liquid through said conduit, a closed container within said reservoir and having a movable wall portion for increasing the volumetric capacity of said container, a liquid conveying conduit member supporting said container and communicatively connecting said container to said conduit intermediate said feeding means and said valve, said container being operable to receive any extra liquid which may be supplied by said feeding means to said conduit and to discharge liquid to said conduit when the liquid supplied by said feeding means is less than that required by said conduit and at substantially the pressure of said feeding means, and means operable by said wall portion upon predetermined increase in the volumetric capacity of said container to control said feeding means.

4. In a liquid feeding apparatus, a casing having a conduit and containing a reservoir with an outlet and with an inlet from said conduit for continuous liquid flow through said conduit and from said outlet, a valve controlling said inlet, means operatively connected to and for actuating said valve in accordance with the liquid level in said reservoir, said casing having a wall opening communicating with said conduit, a pump for feeding liquid to said conduit and having a housing closing said opening against flow from said conduit, a motor carried by said casing and operatively connected to said pump, an expansible container positioned in said reservoir, a conduit member communicating with said conduit and supported by said casing and opening into said container, said container having a movable wall portion, a thrust rod operable by said wall portion, and switch means operable by said rod to control said motor.

5. In a liquid feeding apparatus, a casing having a conduit in a wall thereof, said casing containing a reservoir with an outlet and with an inlet from said conduit for continuous liquid flow through said conduit and from said outlet, a valve controlling said inlet, means operatively connected to and for actuating said valve in accordance with the liquid level in said reservoir, said casing having a wall opening communicating with said conduit, a pump for feeding liquid to said conduit having a housing closing said opening against flow from said conduit, a motor carried by said casing and operatively connected to said pump, an expansible container positioned in said reservoir, a conduit member projecting into said reservoir from the wall of said casing and communicating with said conduit, said container having an end wall with an aperture therethrough receiving said conduit member, said container being secured and sealed at said aperture to said conduit member and having a movable wall portion, a thrust rod operable by said wall portion, and switch means operable by said rod to control said motor.

6. In a liquid feeding apparatus, a casing containing a reservoir and having a bottom wall with a conduit therein, said wall having an aperture therethrough intersecting said conduit, a hollow conduit member closing said aperture and extending into said reservoir, a container member in said reservoir and having an expansible side wall and rigid end walls, one of said walls being apertured to receive said conduit member for establishing communication between said conduit and the interior of said container member, pump means in said conduit and operable to feed liquid to said container member, a motor carried by said casing and having a drive shaft engaging said pump means, a thrust rod operatively connected to the other of said end walls, switch means operable by said rod and controlling said motor, said reservoir having an inlet from said conduit, and liquid level responsive means controlling said inlet.

7. In a liquid feeding apparatus, a casing containing a reservoir and having a bottom wall with a conduit therein, said wall having a passageway leading from said conduit to said reservoir, valve means in and responsive to changes of liquid level in said reservoir and controlling flow through said passageway, a cover member on said casing and having an opening therethrough, said bottom wall having an aperture opening into said conduit and alined with said opening, and means to feed liquid through said conduit to said reservoir, said last-named means being supported in and closing said cover member opening and being supported in and closing said aperture against flow from said conduit.

8. In a liquid feeding apparatus, a casing containing a liquid receiving reservoir, a conduit member extending into said reservoir from the bottom wall of said casing, a container in said reservoir having an expansible side wall and rigid end walls, one of said end walls being apertured to receive said conduit member, switch means carried by said casing, a thrust rod movable by the other of said end walls and operatively connected to said switch means, means carreid by said casing to guide said thrust member, and a helical coil spring surrounding said rod and held under compression between said other end wall and said guide means.

9. In a liquid feeding apparatus, a casing containing a reservoir having a bottom wall with a plurality of conduits therein, said wall having a passageway leading from one of said conduits to said reservoir, said wall having an aperture establishing communication between said reservoir and said first conduit and said second conduit, and pump means in said aperture and sealing communication therethrough between each of said conduits and said reservoir, said pump means being operable to discharge liquid from said second conduit and into said first conduit for delivery to said reservoir through said passageway.

10. In a liquid feeding apparatus, a casing containing a reservoir having a bottom wall with a plurality of conduits therein, said wall having a passageway leading from one of said conduits to said reservoir, said wall having an aperture establishing communication between said reservoir and said first conduit and said second conduit, pump means in said aperture and sealing communication therethrough between each of said conduits and said reservoir, said pump means being operable to discharge liquid from said second conduit and into said first conduit for delivery to said reservoir through said passageway, and means communicating with said first conduit and operable to control the operation of said pump means.

11. In a liquid feeding apparatus, a casing containing a reservoir having a bottom wall with a plurality of conduits therein, said wall having a passageway leading from one of said conduits to said reservoir, said wall having an aperture establishing communication between said reservoir and said first conduit and said second conduit, pump means in said aperture and sealing communication therethrough between each of said conduits and said reservoir, said pump means being operable to discharge liquid from said second conduit and into said first conduit for delivery to said reservoir through said passageway, and liquid receiving means communicating with and operable to control the pressure of the liquid in said first conduit.

12. In a liquid feeding apparatus, a casing containing a reservoir having a bottom wall with a plurality of conduits therein, said wall having a passageway leading from one of said conduits to said reservoir, said wall having an aperture establishing communication between said reservoir and said first conduit and said second conduit, pump means in said aperture and sealing communication therethrough between each of said conduits and said reservoir, said pump means being operable to discharge liquid into said reservoir through said first conduit and said passageway and also operable to discharge liquid into said first conduit at a greater rate than the rate of liquid flow into said reservoir, and a variable volume closed container communicating with said first conduit and operable to receive from and discharge to said first conduit at pump means pressure substantial quantities of liquid so as to permit infrequent operation of said pump means while continuously maintaining the supply of liquid to said passageway at pump means pressure.

13. In a liquid feeding apparatus, a casing having a conduit in a wall thereof, said casing containing a reservoir with an outlet and with an inlet from said conduit for continuous liquid flow through said conduit and from said outlet, a valve controlling said inlet, means operatively connected to and for actuating said valve in accordance with the liquid level in said reservoir, said casing having a wall opening communicating with said conduit, a pump for supplying liquid to said conduit and having a housing closing said opening, a motor carried by said casing and operatively connected to said pump, an expansible container positioned in said reservoir, a conduit member projecting into said reservoir from the wall of said casing and communicating with said conduit, said container having an end wall with an aperture therethrough receiving said conduit member, said container being secured and sealed at said aperture to said conduit member and having a movable wall portion, a thrust rod operable by said wall portion, switch means operable by said rod and having two positions of operation and operable to control said motor, and lost motion means so constructed and arranged that said rod may have considerable movement between said positions of switch operation.

ALBERT G. HANN.
PHILIP S. RUSSEL.